United States Patent
Yoshimura et al.

(10) Patent No.: US 8,205,732 B2
(45) Date of Patent: Jun. 26, 2012

(54) CLUTCH DETENT MECHANISM FOR OUTBOARD MOTOR

(75) Inventors: Hajime Yoshimura, Wako (JP); Ryo Ogasawara, Wako (JP); Nobuchika Katagiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 12/755,886

(22) Filed: Apr. 7, 2010

(65) Prior Publication Data

US 2010/0252392 A1 Oct. 7, 2010

(30) Foreign Application Priority Data

Apr. 7, 2009 (JP) ................. P2009-093347

(51) Int. Cl.
*B63H 20/20* (2006.01)
*F16D 21/04* (2006.01)
*F16D 11/14* (2006.01)

(52) U.S. Cl. .................. 192/51; 192/114 R; 440/75
(58) Field of Classification Search .............. 192/51
See application file for complete search history.

(56) References Cited

U.S. PATENT DOCUMENTS

| 3,386,546 | A | * | 6/1968 | Yourich | 192/51 |
| 4,570,776 | A | * | 2/1986 | Iwashita et al. | 192/114 R |
| 6,132,272 | A | | 10/2000 | Rinzaki et al. | |
| 2009/0209150 | A1 | * | 8/2009 | Yukishima | 440/86 |

FOREIGN PATENT DOCUMENTS

JP 11-222196 A 8/1999

* cited by examiner

*Primary Examiner* — Richard M. Lorence
(74) *Attorney, Agent, or Firm* — Arent Fox LLP

(57) ABSTRACT

A clutch detent mechanism for an outboard motor includes a ball movable with a clutch dog member, a ball retainer member provided in a propeller shaft for retaining the ball in a predetermined position, and a compression coil spring acting on the ball to resiliently force the ball against the ball retainer member. The ball retainer member has a recessed portion for receiving therein the ball to thereby retain the clutch dog member in a neutral position, a front tapered portion provided on one side of the recessed portion for retaining the ball in a position to keep the clutch dog member in a forward shift position, and a rear tapered portion provided on the other side of the recessed portion for retaining the ball in a position to keep the clutch dog member in a reverse shift position.

3 Claims, 4 Drawing Sheets

# CLUTCH DETENT MECHANISM FOR OUTBOARD MOTOR

FIELD OF THE INVENTION

The present invention relates to an improvement in a detent mechanism incorporated in a clutch of an outboard motor.

BACKGROUND OF THE INVENTION

Detent mechanisms are known and used in a clutch of an outboard motor so as to provide a detent feeling in response to an axial movement of a clutch member relative to a pair of opposed bevel gears. A typical example of the known detent mechanisms is disclosed in Japanese Patent Laid-Open Publication (JP-A) No. 11-222196 (corresponding to U.S. Pat. No. 6,132,272 issued on Oct. 17, 2000.

The disclosed detent mechanism is incorporated in a dog clutch of an outboard motor. The dog clutch includes a clutch dog member splined to a propeller shaft between a pair of driven bevel gears rotatably mounted on the propeller shaft. The driven bevel gears mesh with a driving bevel gear secured to the lower end of a drive shaft coupled to the crankshaft of an engine. The clutch dog member is slidably mounted on the propeller shaft and movable in an axial direction relative to the driven bevel gears.

The detent mechanism consists of a spring and balls that are accommodated in a hollow slide rod coupled to an end of the propeller shaft. By manually displacing the slide rod in an axial direction, the human operator can selectively cause the clutch dog member to engage with one, the other, or neither of the driven bevel gears to thereby select a desired shift position. In this instance, the detent mechanism gives the operator a detent feeling when any of the shift positions is selected.

When the clutch dog member is axially displaced in a direction to place one of crown gears formed on both axial end faces of the clutch dog member into meshing engagement with a mating one of crown gears formed on the driven bevel gears, it may occur that the crown gear of the clutch dog member and the meting crown gear of one driven bevel gear impinge together and generate unpleasant striking noise when they are subjected to torsional vibrations produced when the engine undergoes irregular combustion. In order to avoid the generation of striking noise, an attempt has been made to increase the weight of a flywheel attached to an engine crankshaft or to provide a torsion bar in a power transmission path. The prior attempt is not successful because due to complicated construction, it requires an additional cost, an increase in weight and a large installation space.

It is accordingly an object of the present invention to provide a clutch detent mechanism for an outboard motor, which is simple in construction but is able to preclude the generation of unpleasant striking noise from a dog clutch in which the clutch detent mechanism is incorporated.

SUMMARY OF THE INVENTION

According to the present invention, there is provided a clutch detent mechanism for an outboard motor including a clutch dog member slidably mounted on a propeller shaft for undergoing axial sliding movement on the propeller shaft to move into meshing engagement with one, the other or neither of a forward gear and a reverse gear that are rotatably mounted on the propeller shaft on opposite sides of the clutch dog member. The clutch detent mechanism is configured to hold clutch dog member in one shift position selected from among a forward shift position in which the clutch dog member is engaged with the forward gear, a reverse shift position in which the clutch dog member is engaged with the reverse gear, and a neutral position in which the clutch dog member is engaged with neither of the forward and reverse gears. The clutch detent mechanism comprises at least one ball movable with the clutch dog member, a ball retainer member provided in the propeller shaft for retaining the ball, and urging means for urging the ball against the ball retainer. The ball retainer member has a recessed portion for holding therein the ball to thereby keep the clutch dog member in the neutral position, a first sloped portion provided on one side of the recessed portion for retaining the ball in a first position to keep the clutch dog member in the forward shift position, and a second sloped portion provided on the other side of the recessed portion for retaining the ball in a second position to keep the clutch dog in the reverse shift position. When the ball is disposed in the recessed portion, the clutch dog member blocks transmission of power from the forward or reverse gear to the propeller shaft. When the ball is disposed in the first position, the ball is urged by the urging means against the first sloped portion of the ball retainer member and creates a first axial pressing force tending to force the clutch dog member against the forward gear while the clutch dog member and the forward gear are in meshing engagement with each other. And, when the ball is disposed in the second position, the ball is urged by the urging means against the second sloped portion of the ball retainer member and creates a second axial pressing force tending to force the clutch dog member against the reverse gear while the clutch dog member and the reverse gear are in meshing engagement with each other.

When the ball is disposed in the first or second sloped portion of the ball retainer member, the ball while being urged by the urging means against the first or second sloped portion of the ball retainer member creates an axial component force (pressing force), which tends to force the clutch dog member against the forward or reverse gear while the clutch dog member and the forward or reverse gear are in meshing engagement with each other. By the action of the axial component force (pressing force), the clutch dog member and the forward or reverse gear are continuously held together during meshing engagement and, hence, it is unlikely to occur that the clutch dog member and the forward or reverse gear hit together in the circumferential direction thereof and generate unpleasant striking noise when they are subjected to torsional vibrations produced when the engine undergoes irregular combustion. Thus, the outboard motor can operate relatively silently without generating unpleasant striking noise from the dog clutch mechanism.

Furthermore, the clutch detent mechanism using the ball and the ball retainer member having two sloped portions on opposite sides of the recessed portion is simple in construction and inexpensive to manufacture but is able to preclude the generation of unpleasant striking nose without increasing the cost and weight of the outboard motor.

In one preferred form of the invention, the urging means is accommodated in a shift slider provided in the propeller shaft and connected to the clutch dog member, the urging means comprising a pair of axially aligned compression coil springs disposed in an axial central hole of the shaft slider, and a pair of first balls disposed in the axial hole of the shift slider and held in contact with opposing inner ends of the compression coil springs. The at least one ball comprises a pair of second balls movably disposed in a pair of diametrically opposite radial through-holes, respectively, of the shift slider and urged in a radial outward direction by the compression coil springs via the first balls.

Preferably, the ball retainer member has a tubular body having an inner peripheral surface formed with an annular recessed portion forming the recessed portion of the ball retainer member, a front tapered portion provided on one axial side of the annular recessed portion and forming the first sloped portion of the ball retainer member, and a rear tapered portion provided on the other axial side of the annular recessed portion and forming the second sloped portion of the ball retainer member.

BRIEF DESCRIPTION OF THE DRAWINGS

One preferred structural embodiment of the present invention will be described in detail herein below, by way of example only, with reference to the accompanying sheets of drawings, in which.

DETAILED DESCRIPTION OF THE PREFERRED EMBODIMENT

Figure 1:
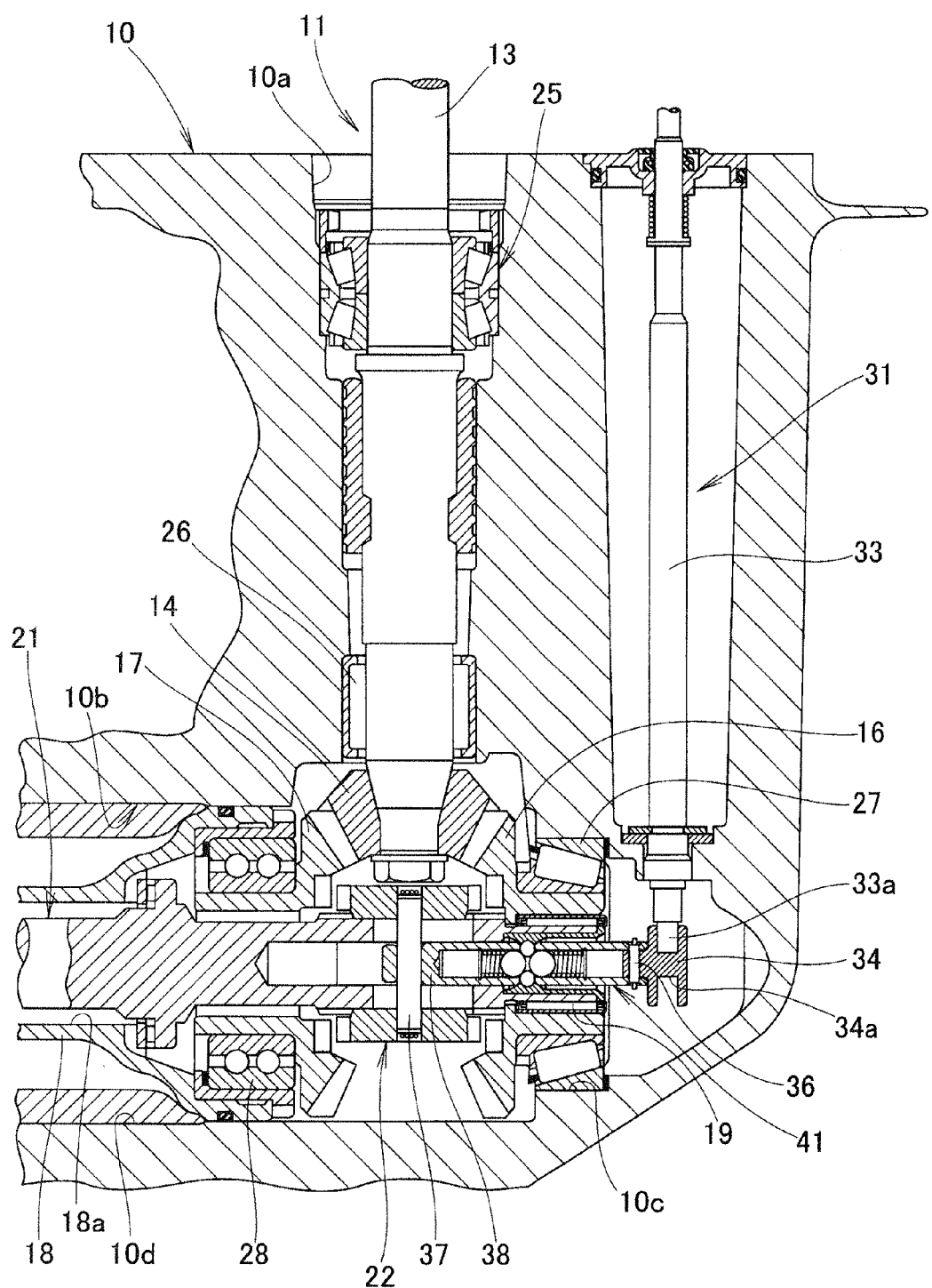
FIG. 1 is a vertical cross-sectional view of a portion of an outboard motor including a power transmission system in which a clutch detent mechanism according to the present invention is incorporated.

Referring now to the drawings and FIG. 1 in particular, there is shown a gear case 10 which constitutes a lower part of an outboard motor. The gear case 10 includes a power transmission mechanism 11 for transmitting power from an engine (not shown) disposed at an upper part of the outboard motor to a screw propeller (not shown) disposed at a rear end of the lower part of the outboard motor.

The power transmission mechanism 11 includes a drive shaft 13 extending vertically downwardly inside the gear case 10 and rotatably mounted in the gear case 10, a driving bevel gear 14 fixedly mounted to a lower end of the drive shaft 13, a pair of driven bevel gears 16 and 17 meshing with the driving bevel gear 14, a propeller shaft 21 disposed horizontally and rotatably supported by the forward driven bevel gear 16 and a propeller shaft holder 18 disposed horizontally inside the gear case 10, and a clutch dog member 22 disposed between the forward and reverse driven bevel gears 16, 17 and spline-coupled with the propeller shaft 21 for undergoing sliding movement in the axial direction of the propeller shaft 21.

The drive shaft 13 is rotatably supported by a double-row taper roller bearing 25 and a needle bearing 26 disposed in a vertical hole 10a formed in the gear case 10. The forward driven bevel gear (forward gear) 16 is rotatably supported by a taper roller bearing 27 disposed in a horizontal hole 10b (and more particularly in a front portion 10c of the horizontal hole 10b) formed in the gear case 10.

The reverse driven bevel gear (reverse gear) 17 is rotatably supported by a double-row angular ball bearing 28 disposed in a front end portion (right end portion in FIG. 1) of the propeller shaft holder 18 fitted in the horizontal hole 10b (and more particularly in a rear portion 10d of the horizontal hole 10b).

The propeller shaft holder 18 has a hollow cylindrical portion 18a, and a front end portion of the propeller shaft 21 is rotatably supported by a needle bearing (not shown) disposed in the hollow cylindrical portion 18a of the propeller shaft holder 18.

The propeller shaft 21 is rotatably mounted in the gear case 10 via the non-illustrated needle bearing disposed in the hollow cylindrical portion 18a of the propeller shaft holder 18 and a needle bearing 19 disposed on an inner peripheral surface of the forward driven bevel gear 16.

A shift mechanism 31 is associated with the front end portion of the propeller shaft 21 for switching operation of the outboard motor between a forward movement, a reverse movement and a stop, which correspond respectively to a forward rotation, a reverse rotation and a stop of the screw propeller. The shift mechanism 31 has a shift rod 33 extending vertically in the gear case 10 and rotatably mounted to the gear case 10, a shift piece 34 connected to a lower end portion of the shift rod 33, a shift slider 38 slidably inserted in the front end portion of the propeller shaft 21 with a front end thereof (right end in FIG. 1) connected by a front connecting pin 36 to the shift piece 34 and with a rear end thereof (left end in FIG. 1) connected by a rear connecting pin 37 to the clutch dog member 22, and a clutch detent mechanism 41 for holding the shift slider 38 and the clutch dog member 22 in a selected shift position.

Although not shown in the drawings, the shift rod 33 is connected to a handle or other suitable means for allowing a human operator to operate the shift rod 33. The shift rod 33 has a lower end provided with an off-centered pin member 33a extending downwardly to fit in a circumferential groove 34a of the shift piece 34, so that rotational movements of the shift rod 33 around its longitudinal axis are converted into horizontal axial movements of the shift slider 38. The axial movements of the shift slider 38 lead to axial movements of the clutch dog member 22 on the propeller shaft 21. Thus, by operating the shift rod 33, the operator can selectively cause the clutch dog member 22 to engage one, the other, or neither of the driven bevel gears 16 and 17 to thereby select a desired shift position.

Figure 2:
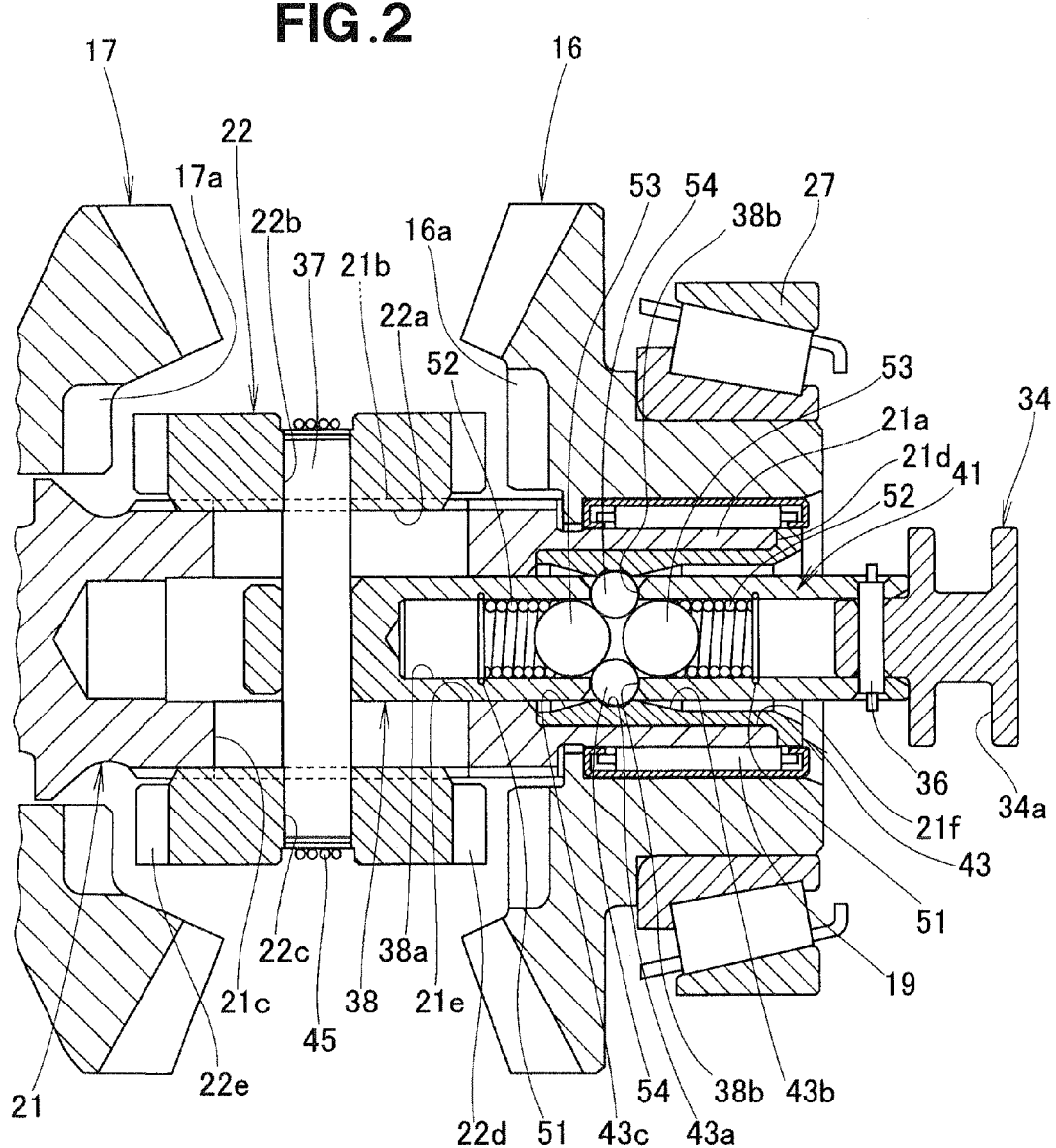
FIG. 2 is an enlarged cross-sectional view showing the clutch detent mechanism and related parts thereof.

As shown in FIG. 2, the forward driven bevel gear 16 has a crown gear 16a formed on an end face thereof that opposes an axial end face of the clutch dog member 22, and the reverse driven gear 17 has a crown gear 17a formed on an end face thereof that opposes another axial end face of the clutch dog member 22.

The front end portion of the propeller shaft 21 has a small-diameter portion 21a at a front end thereof, a male-spline portion (splined shaft portion) 21b contiguous to a rear end of the small-diameter portion 21a and having an outside diameter larger than that of the small-diameter portion 21a, an oblong hole 21c extending diagrammatically across the male-spline portion 21b and having a major axis parallel to the central axis of the propeller shaft 21, and a slider insertion hole 21e extending inwardly from an end face 21d of the propeller shaft 21 along the central axis of the propeller shaft 21 for slidably receiving therein the shift slider 38. The slider insertion hole 21e is enlarged at an outer end portion thereof, so that a large-diameter end hole 21f is formed. The large-diameter end hole 21f has an inside diameter larger than that of the slider insertion hole 21e. A ball retainer member 43 is press-fitted in the large-diameter end hole 21f of the propeller shaft 21.

The clutch dog member 22 has a female-spline (splined hole) 22a coupled with the male-spline portion (splined shaft portion) 21b of the propeller shaft 21, a pair of aligned radial through-holes 22b and 22c for receiving therein longitudinal portions of the rear connecting pin 37, a forward crown gear 22d formed on one end face thereof for meshing engagement with the crown gear 16a of the forward driven bevel gear 16, and a reverse crown gear 22e formed on the other end face thereof for meshing engagement with the crown gear 17a of the reverse driven bevel gear 17.

The rear connecting pin 37, as it is inserted in the radial through-holes 22b and 22c, extends longitudinally through the oblong hole 21c diametrically across the shift slider 38. Reference numeral 45 denotes a retaining ring which prevents the rear connecting pin 37 from displacing off the radial through-holes 22b, 22c of the clutch dog member 22.

The clutch detent mechanism 41 includes a pair of axially aligned compression coil springs 52, 52 disposed in an axial central hole 38a of the shift slider 38 with one end (an outer end) of each compression coil spring 52 retained by a snap ring 51 positioned in the central hole 38a, a pair of first balls 53, 53 disposed in the axial central hole 38a of the shaft slider and held in contact with inner ends of the respective compression coil springs 52, 52, a pair of second balls 54, 54 movably disposed in a pair of diametrically opposite radial through-holes 38b, 38b, respectively, of the shift slider 38 and urged via the first balls 53 in a radial outward direction by the resiliency of the compression coil springs 52, and the ball retainer member 43 for holding or retaining the second balls 54 in a selected one of three desired positions, as will be described later.

The ball retainer member 43 has an inner peripheral surface formed with an annular recessed portion 43a, a front tapered portion (first sloped portion) 43b provided on one axial side of the annular recessed portion 43a, and a rear tapered portion (second sloped portion) 43c provided on the other axial side of the annular recessed portion 43a. In a condition shown in FIG. 2, the second balls 54, 54 are retained in the annular recessed portion 43a of the ball retainer member 43 under the resiliency of the compression springs 52, 52 acting on the second balls 54 via the first balls 53.

In the condition shown in FIG. 2, the clutch dog member 22 meshes with neither of the forward drive bevel gears 16 and the reverse driven bevel gear 17, so that power transmission from the drive side to the propeller shaft 21 does not take place.

Figure 3:
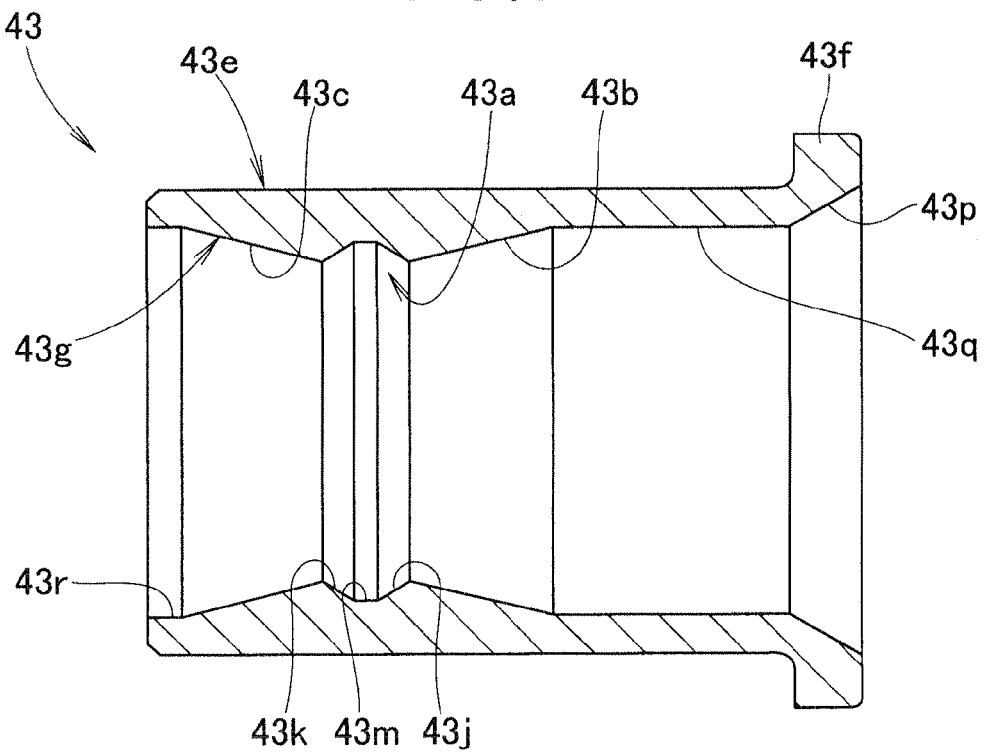
FIG. 3 is a cross-sectional view of a ball-retainer member of the clutch detent mechanism.

As shown in FIG. 3, the ball retainer member 43 includes a tubular body 43e and an end flange 43f formed integrally with the tubular body 43e at an end (right end in FIG. 3) of the tubular body 43e. The tubular body 43e includes the annular recessed portion 43a and the front and rear tapered portions 43b and 43c that are formed on an inner peripheral surface 43g of the tubular body 43e. The annular recessed portion 43a is formed by inclined front and rear side surfaces 43j and 43k and a flat central bottom surface 43m disposed between the front and rear side surfaces 43j, 43k. The front tapered portion 43b extends continuously from a front end (right end in FIG. 3) of the recessed portion 43a toward the front end portion of the tubular body 43e in such a manner that the inside diameter of the front tapered portion 43b increases gradually with increasing distance from the recessed portion 43a. Similarly, the rear tapered portion 43c extends continuously from a rear end (left end in FIG. 3) of the recessed portion 43a toward the rear end portion of the tubular body 43a in such a manner that the inside diameter of the rear tapered portion 43c increases gradually with increasing distance from the recessed portion 43a. In FIG. 3, reference character 43p denotes a chamfered inner front edge of the end flange 43f; 43q a front non-tapered portion of constant diameter extending between the front tapered portion 43b and the chamfered inner front edge 43p of the end flange 43f; and 43r a rear non-tapered portion of constant diameter formed rearwardly of the rear tapered portion 43c. The front and rear non-tapered uniform diameter portions 43q and 43r have the same inside diameter.

Figure 4:
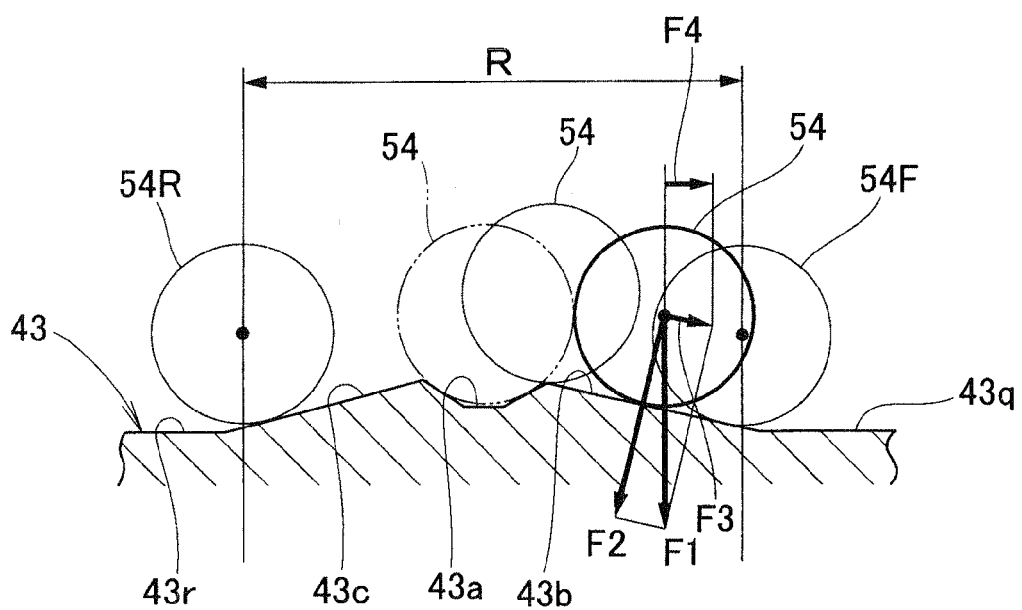
FIG. 4 is a diagrammatical view illustrative of the operation of the clutch detent mechanism.

The clutch detent mechanism 41 of the foregoing construction will operate as follows. As shown in FIG. 4, each second ball 54 is displaced from the recessed portion 43a to the front tapered portion 43b, the second ball 54 is subjected to a resilient force F1 transmitted from the compression coil springs 52, 52 (FIG. 2) via the first balls 53, 53 to radial outer portions (lower portions in FIG. 4) of the second ball 54.

The resilient force F1 has a first component force F2 and a second component force F3. The first component force F2 acts on the front tapered portion 43b in a direction perpendicular to the front tapered portion 43b, while the second component force F3 acts in a direction parallel to the front tapered portion 43b. The second ball 54 tends to roll in a forward direction (rightward direction in FIG. 4) along the front tapered portion 43b by the action of the second component force F3. The second component force F3 has an axial component force (pressing force) F4, which acts to force or press the second ball 54 in the forward direction. It will be appreciated that the foregoing actions of the forces F1-F4 also occur when the second ball 54 is located on the rear taper portion 43c excepting that the component forces F3 and F4 act in a rearward direction (leftward direction of FIG. 4).

Figure 5A:
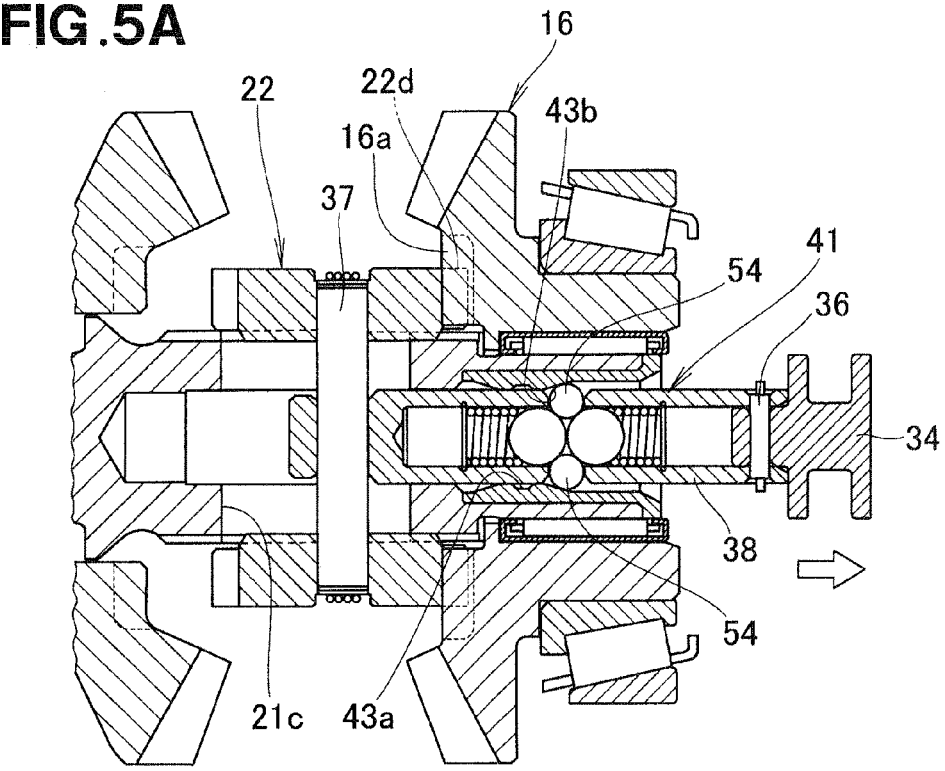
FIG. 5A is a cross-sectional view showing a clutch member held in a forward position by the clutch detent mechanism.

As shown in FIG. 5A, when the shift piece 34 is displaced from the position of FIG. 2 in the forward direction as indicated by the profiled arrow so as to move the shift slider 38 in the forward direction, the clutch dog member 22 coupled by the rear connecting pin 37 to the shift slider 38 moves forwardly and the forward crown gear 22d comes into meshing engagement with the crown gear 16a of the forward driven bevel gear 16.

The second balls 54 (one shown in FIG. 4) are designed to undergo rolling movement along the inner peripheral surface 43g of the ball retainer member 43 within a movable range R defined between a forward end which is located adjacent to but displaced from a boundary between the front non-tapered portion 43q and the front tapered portion 43b toward the recessed portion 43a, and a rear end which is located adjacent to but displaced from a boundary between the rear non-tapered portion 43r and the rear tapered portion 43c toward the recessed portion 43a. In other words, the front end of the movable range R is located short of a large-diameter end of the front tapered portion 43b, and the rear end of the movable range R is located short of a large-diameter end of the rear tapered portion 43c.

Further forward movement of the second balls 54, 54 on and along the front tapered portion 43b together with the shift slider 38 will cause the second balls 54, 54 to arrive at the forward end of the movable range R, as indicated by reference character 54F shown in FIG. 4. In this position, the shift slider 38 and the clutch dog member 22 are held in a forward shift position in which power from the engine to cause a forward rotation of the screw propeller is transmitted to the propeller shaft 21 (FIG. 5A).

While the second balls 54 are located at the forward end of the movable range R (FIG. 4), the second balls 54 create a pressing force F4 acting in the forward direction, as described above with reference to FIG. 4. The pressing force F4 is transmitted from the second balls 54 via the shift slider 38 and the rear connecting pin 37 to the clutch dog member 22 and eventually forces the forward crown gear 22d of the clutch dog member 22 against the crown gear 16a of the forward driven bevel gear 16 while the forward crown gear 22d and the crown gear 16a are in mesh with each other.

Thus, even if there is a clearance between the forward crown gear 22d of the clutch dog member 22 and the crown gear 16a of the forward driven bevel gear 16 as viewed in a circumferential direction of the crown gears 22d, 16a, once the forward crown gear 22d and the crown gear 16a engage together, they are continuously kept together by the pressing force F4. By the action of the pressing force F4, it is unlikely to occur that the crown gears 22d, 16a strike together in the circumferential direction thereof and generate unpleasant striking noise when they are subjected to torsional vibrations produced when the engine undergoes irregular combustion.

Figure 5B:
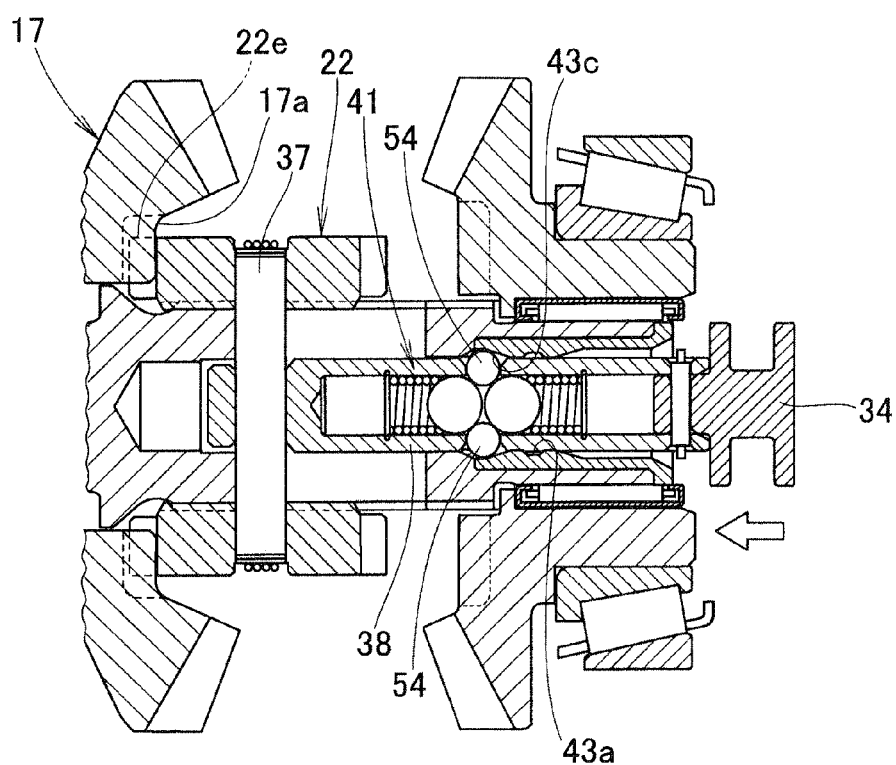
FIG. 5B is a cross-sectional view showing a clutch member held in a reverse position by the clutch detent mechanism.

As shown in FIG. 5B, when the shift piece 34 is displaced from the position of FIG. 2 in the rearward direction as indicated by the profiled arrow so as to move the shift slider 38 in the rearward direction, the clutch dog member 22 coupled by the rear connecting pin 37 to the shift slider 38 moves rearwardly and the reverse crown gear 22e of the clutch dog member 22 comes into meshing engagement with the crown gear 17a of the reverse driven bevel gear 17.

Further rearward movement of the second balls 54, 54 on and along the rear tapered portion 43c together with the shift slider 38 will cause the second balls 54, 54 to arrive at the rearward end of the movable range R, as indicated by reference character 54R shown in FIG. 4. In this position, the shift slider 38 and the clutch dog member 22 are held in a reverse shift position in which power from the engine to cause a reverse rotation of the screw propeller is transmitted to the propeller shaft 21 (FIG. 5B).

While the second balls 54 are located at the rearward end of the movable range R (FIG. 4), the second balls 54 create a pressing force acting in the rearward direction, the pressing force being equal in magnitude to but opposite in direction from the pressing force F4 shown in FIG. 4. The pressing force is transmitted from the second balls 54 via the shift slider 38 and the rear connecting pin 37 to the clutch dog member 22 and eventually forces the rearward crown gear 22e of the clutch dog member 22 against the crown gear 17a of the reverse driven bevel gear 17 while the reverse crown gear 22e and the crown gear 17a are in mesh with each other.

In the same manner as described above with reference to FIG. 5A, the reverse crown gear 22e of the clutch dog member 22 engages with the crown gear 17a of the reverse driven bevel gear 17 while it is forced against the crown gear 17a by the pressing force (see F4 shown in FIG. 4). By the action of the pressing force, it is unlikely to occur that the crown gears 22d, 16a strike together in the circumferential direction thereof and generate unpleasant striking noise when they are subjected to torsional vibrations produced when the engine undergoes irregular combustion.

As thus far described, a clutch detent mechanism is provided according to the invention for an outboard motor including a clutch dog member slidably mounted on a propeller shaft for undergoing axial sliding movement on the propeller shaft to move into meshing engagement with one, the other or neither of a forward gear and a reverse gear that are rotatably mounted on the propeller shaft on opposite sides of the clutch dog member. The clutch detent mechanism is configured to hold clutch dog member in one shift position selected from among a forward shift position in which the clutch dog member is engaged with the forward gear, a reverse shift position in which the clutch dog member is engaged with the reverse gear, and a neutral position in which the clutch dog member is engaged with either of the forward and reverse gears. The clutch detent mechanism comprises at least one ball movable with the clutch dog member, a ball retainer member provided in the propeller shaft for retaining the ball, and urging means for urging the ball against the ball retainer. The ball retainer member has a recessed portion for holding therein the ball to thereby keep the clutch dog member in the neutral position, a first sloped portion provided on one side of the recessed portion for retaining the ball in a first position to keep the clutch dog member in the forward shift position, and a second sloped portion provided on the other side of the recessed portion for retaining the ball in a second position to keep the clutch dog in the reverse shift position. When the ball is disposed in the recessed portion, the clutch dog member blocks transmission of power from the forward or reverse gear to the propeller shaft. When the ball is disposed in the first position, the ball is urged by the urging means against the first sloped portion of the ball retainer member and creates a first axial pressing force tending to force the clutch dog member against the forward gear while the clutch dog member and the forward gear are in meshing engagement with each other. And, when the ball is disposed in the second position, the ball is urged by the urging means against the second sloped portion of the ball retainer member and creates a second axial pressing force tending to force the clutch dog member against the reverse gear while the clutch dog member and the reverse gear are in meshing engagement with each other.

When the ball is disposed in the first or second sloped portion of the ball retainer member, the ball while being urged by the urging means against the first or second sloped portion of the ball retainer member creates an axial component force (pressing force), which tends to force the clutch dog member against the forward or reverse gear while the clutch dog member and the forward or reverse gear are in meshing engagement with each other. By the action of the axial component force (pressing force), the clutch dog member and the forward or reverse gear are continuously held together during meshing engagement and, hence, it is unlikely to occur that the clutch dog member and the forward or reverse gear hit together in the circumferential direction thereof and generate unpleasant striking noise when they are subjected to torsional vibrations produced when the engine undergoes irregular combustion. Thus, the outboard motor can operate relatively silently without generating unpleasant striking noise from the dog clutch mechanism.

Furthermore, the clutch detent mechanism using the ball and the ball retainer member having two sloped portions on opposite sides of the recessed portion is simple in construction and inexpensive to manufacture but is able to preclude the generation of unpleasant striking nose without increasing the cost and weight of the outboard motor.

Obviously, various minor changes and modifications of the present invention are possible in light of the above teaching. It is therefore to be understood that within the scope of the appended claims the invention may be practiced otherwise than as specifically described.

What is claimed is:

1. A clutch detent mechanism for an outboard motor including a clutch dog member slidably mounted on a propeller shaft for undergoing axial sliding movement on the propeller shaft to move into meshing engagement with one, the other or neither of a forward gear and a reverse gear that are rotatably mounted on the propeller shaft on opposite sides of the clutch dog member, the clutch detent mechanism being configured to hold clutch dog member in one shift position selected from among a forward shift position in which the clutch dog member is engaged with the forward gear, a reverse shift position in which the clutch dog member is engaged with the reverse gear, and a neutral position in which the clutch dog member is engaged with neither of the forward and reverse gears, the clutch detent mechanism comprising:

at least one ball movable with the clutch dog member;

a ball retainer member provided in the propeller shaft for retaining the ball; and urging means for urging the ball against the ball retainer, wherein the ball retainer member has a recessed portion for holding therein the ball to thereby keep the clutch dog member in the neutral position, a first sloped portion provided on one side of the recessed portion for retaining the ball in a first position to keep the clutch dog member in the forward shift position, and a second sloped portion provided on the other side of the recessed portion for retaining the ball in a second position to keep the clutch dog in the reverse shift position, wherein when the ball is disposed in the recessed portion, the clutch dog member blocks transmission of power from the forward or reverse gear to the propeller shaft, wherein when the ball is disposed in the first position, the ball is urged by the urging means against the first sloped portion of the ball retainer member and creates a first axial pressing force tending to force the clutch dog member against the forward gear while the clutch dog member and the forward gear are in meshing engagement with each other, and wherein when the ball is disposed in the second position, the ball is urged by the urging means against the second sloped portion of the ball retainer member and creates a second axial pressing force tending to force the clutch dog member against the reverse gear while the clutch dog member and the reverse gear are in meshing engagement with each other.

2. The clutch detent mechanism of claim 1, wherein the urging means is accommodated in a shift slider provided in the propeller shaft and connected to the clutch dog member, the urging means comprising a pair of axially aligned compression coil springs disposed in an axial central hole of the shaft slider, and a pair of first balls disposed in the axial hole of the shift slider and held in contact with opposing inner ends of the compression coil springs, and wherein the at least one ball comprises a pair of second balls movably disposed in a pair of diametrically opposite radial through-holes, respectively, of the shift slider and urged in a radial outward direction by the compression coil springs via the first balls.

3. The clutch detent mechanism of claim 1, wherein the ball retainer member has a tubular body having an inner peripheral surface formed with an annular recessed portion forming the recessed portion of the ball retainer member, a front tapered portion provided on one axial side of the annular recessed portion and forming the first sloped portion of the ball retainer member, and a rear tapered portion provided on the other axial side of the annular recessed portion and forming the second sloped portion of the ball retainer member.

* * * * *